Figure 1:
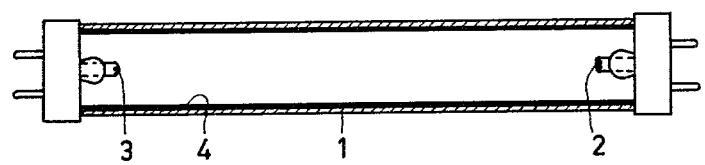

United States Patent [19]

Looye et al.

[11] 4,319,161
[45] Mar. 9, 1982

[54] LUMINESCENT SCREEN AND LOW PRESSURE MERCURY VAPOR DISCHARGE LAMP CONTAINING THE SAME

[75] Inventors: Bob Looye; Johannes T. W. deHair; Cornelis Bakker, all of Eindhoven, Netherlands

[73] Assignee: U.S. Philips Corporation, New York, N.Y.

[21] Appl. No.: 166,505

[22] Filed: Jul. 7, 1980

[30] Foreign Application Priority Data

Jul. 23, 1979 [NL] Netherlands ............ 7905680

[51] Int. Cl.$^3$ ............ C09K 11/46; H01J 1/63
[52] U.S. Cl. ............ 313/486; 252/301.4 R; 252/301.6 R; 428/690
[58] Field of Search ............ 252/301.4 R, 301.6 R; 313/486; 428/690

[56] References Cited

U.S. PATENT DOCUMENTS

| | | | |
|---|---|---|---|
| 3,014,877 | 12/1961 | Ranby | 252/301.4 R |
| 3,423,325 | 1/1969 | Wanmaker et al. | 252/301.4 R |
| 3,542,690 | 11/1970 | Borchardt | 252/301.4 R |
| 3,575,879 | 4/1971 | Blasse et al. | 252/301.4 R |
| 4,103,173 | 7/1978 | Danielmeyer et al. | 252/301.4 R X |
| 4,150,321 | 4/1979 | Schetters et al. | 252/301.4 R X |
| 4,233,538 | 11/1980 | Van de Spidker et al. | 252/301.4 R X |

FOREIGN PATENT DOCUMENTS 2410134  9/1974  Fed. Rep. of Germany ... 252/301.4 R

OTHER PUBLICATIONS

Bril et al., "J. Electrochem Soc.", vol. 117, No. 3, 1970, pp. 346-348.
Bril et al., "J. Electrochem Soc.", vol. 111, No. 12, 1964, pp. 1363-1368.
Blasse et al., "J. of Chemical Physics", vol. 47, No. 6, 1967, pp. 1920-1926.

Primary Examiner—Jack Cooper
Attorney, Agent, or Firm—Robert S. Smith

[57] ABSTRACT

A luminescent screen comprising a luminescent metaborate provided on a support and having a composition defined by the formula $$(Y, La)_{1-x-y-z}Ce_xGd_yTb_z(Mg, Zn)_{1-p}Mn_pB_5O_{10},$$

wherein,
if $y=z=p=0$, it holds that
  $0.01 \leq x \leq 1.0$,
if $z=p=0$, it holds that
  $0.01 \leq x \leq 1-y$
  $0.02 \leq y \leq 0.80$,
if $p=0$, it holds that
  $0.01 \leq x \leq 1-y-z$
  $0 \leq y \leq 0.98$
  $y+z \leq 0.99$
  $0.01 \leq z \leq 0.75$,
if $z=0$, it holds that
  $0.01 \leq x \leq 1-y$
  $0 \leq y \leq 0.99$
  $0.01 \leq p \leq 0.30$,
and if both $p \neq 0$ and $z \neq 0$, it holds that
  $0.01 \leq x \leq 1-y-z$
  $0 \leq y \leq 0.98$
  $0.01 \leq z \leq 0.75$
  $y+z \leq 0.99$
  $0.01 \leq p \leq 0.30$.

10 Claims, 5 Drawing Figures

LUMINESCENT SCREEN AND LOW PRESSURE MERCURY VAPOR DISCHARGE LAMP CONTAINING THE SAME

The invention relates to a luminescent screen comprising a luminescent metaborate, provided on a support. The invention further relates to a low-pressure mercury vapor discharge lamp comprising such a luminescent screen.

Netherlands Patent Application No. 7,607,724 (PHN No. 8464) discloses a luminescent screen containing a luminescent borate the host lattice of which is defined by the formula $LnB_3O_6$, wherein Ln represents a rare earth metal. Activation of these known metaborates by Gd, Bi, Ce, Tb and/or Dy furnishes efficiently luminescing materials.

The invention has for its object to provide novel luminescent metaborates which, when used in a luminescent screen, have greatly desired luminescent properties.

A luminescent screen according to the invention comprises a luminescent metaborate, provided on a support, and is characterized in that the borate has a composition defined by the formula

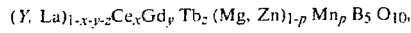

$(Y, La)_{1-x-y-z}Ce_xGd_yTb_z(Mg, Zn)_{1-p}Mn_p B_5O_{10}$, wherein,
if $y=z=p=0$, it holds that $0.01 \leq x \leq 1.0$
if $z=p=0$, it holds that
  $0.01 \leq x \leq 1-y$,
  $0.02 \leq y \leq 0.80$,
if $p=0$, it holds that
  $0.01 \leq x \leq 1-y-z$
  $0 \leq y \leq 0.98$
  $y+z \leq 0.99$
  $0.01 \leq z \leq 0.75$
if $z=0$, it holds that
  $0.01 \leq x \leq 1-y$
  $0 \leq y \leq 0.99$
  $0.01 \leq p \leq 0.30$,
and if both $p \neq 0$ and $z \neq 0$, it holds that
  $0.01 \leq x \leq 1-y-z$
  $0 \leq y \leq 0.98$
  $0.01 \leq z \leq 0.75$
  $y+z \leq 0.99$
  $0.01 \leq p \leq 0.30$.

The luminescent borates of a luminescent screen according to the invention are crystalline materials the host lattice composition of which may be represented by the formula $(Y, La)(Mg, Zn)B_5O_{10}$. It was found that these novel materials have a monoclinic crystal structure which corresponds to the structure of $LaCoB_5O_{10}$, $NdCoB_5O_{10}$ and $SmCoB_5O_{10}$. The crystal structure of the last-mentioned material, for example, is described in Kristallografiya, 19. 737 (1974). From experiments which resulted in the invention it appeared that these novel metaborates, which contain Y and/or La and Mg and/or Zn form very efficiently luminescing materials on activation by one or more of the activator elements Ce, Gd, Tb and Mn. They can be excellently excited by ultraviolet radiation, and particularly by short-wave ultraviolet radiation.

They are, consequently, very suitable for practical use in the luminescent screen of a low-pressure mercury vapor discharge lamp. It further appeared that the borates according to the invention can also be excited in a different manner, for example by electrons. The spectral distribution of the radiation emitted by the borates depends on the activator or activators used. The concentration of a certain activator is chosen within a certain range, since, below a certain minimum value of the concentration of that activator too low an absorption of the excitation energy and/or too low a quantum efficiency occurs, and as above a certain maximum value radiation fluxes are obtained which are too low owing to concentration quenching. It was found that the choice of the component cations for the host lattice, Y or La or both and Mg or Zn or both, have little influence on the luminescent properties of the luminescent borate.

When the borate defined by the above-mentioned general formula are activated by Ce alone (that is to say $y=z=p=0$) materials are obtained which have an efficient narrow band emission of short wavelength. The emission maximum is located at 300-305 nm and the half-value width of the emission band is 35 nm. In these materials which are particularly suitable for use in the luminescent screen of low-pressure mercury vapor discharge lamps for photo-chemical purposes, for example for generating erythema, the Ce-content x is chosen to be at least 0.01. The maximum value of x is 1.0, as concentration quenching does not occur in these materials to any significant extent.

The borates activated by Ce and Gd (wherein $z=p=0$) are efficiently luminescing materials, which emit the characteristic line emission of Gd with an emission maximum at 313 nm. In these materials the excitation energy is transferred from the Ce-ions to the Gd-ions. The Gd-concentration y may then be chosen between wide limits (from 0.02 to 0.80). The minimum Ce-concentration x is here also 0.01. As there is no significant concentration quenching effect, the Ce-content may be increased until all the available Y- and/or La-positions are occupied ($x \leq 1-y$). The borates with Gd-emission are used in the luminescent screen of low-pressure mercury vapor discharge lamps for photo-chemical purposes, irradiation purposes in particular, for example the photo-therapy of skin diseases such as psoriasis.

The borates according to the invention activated by Ce and Tb, ($p=0$) are very efficiently, green-luminescing materials (characteristic Tb-emission). In these materials the excitation energy is absorbed by the Ce and transferred to the Tb. Also here the Ce content x is at least 0.01. The Tb-content z should be at least 0.01 and not more than 0.75. These borates may also contain Gd (y from 0 to 0.98), the energy transfer from the Ce to the Tb proceeding partly via Gd-ions. The sum of Gd- and Tb-contents y+z must not be more than 0.99, as at least 0.01 mole Ce must be present. The upper limit of the Ce-content is determined by the number of available positions in the lattice ($x \leq 1-y-z$). The green luminescing, Tb-activated borates are used in the luminescent screen of special purpose low-pressure mercury vapor discharge lamps (for example for electro-photography) or, in combination with other luminescent materials, in low-pressure mercury vapor discharge lamps used for general lighting purposes.

The Mn-activated borates ($z=0$) according to the invention luminesce in a band (half-value width approximately 80 nm) having a maximum in the red portion of the spectrum at approximately 622 nm. They are therefore very suitable for use as the red component or as the colour-correcting component in the luminescent screen of low-pressure mercury vapor discharge lamps used for general lighting purposes. Also in these materials the excitation energy is transferred from the Ce (Ce-content from 0.01 to $1-y$) to the Mn. These materials may also contain Gd (y from 0 to 0.99). The Mn-content p should be chosen in the range from 0.01 to 0.30.

The borates, which contain both Mn and Tb (consequently $p \neq 0$ and $z \neq 0$) show the red Mn-emission as well as the green Tb-emission. These materials are suitable for use in the screen of low-pressure mercury vapor discharge lamps used for general lighting purposes. In these materials the Ce is again present in a concentration of at least 0.01 and not more than $1-y-z$. The materials may contain Gd (y from 0 to 0.98). The range for the Tb- and Mn-content is equal to the content of the materials having only Tb- emission or only Mn-emission ($0.01 \leq z \leq 0.75$ and $0.01 \leq p \leq 0.30$).

It was found that the Ce-emission is most efficient in the borates (wherein $y=z=p=0$) which have a Ce-content x from 0.01 to 0.50. A luminescent screen containing these materials is therefore preferred, if Ce-emission is desired.

According to the invention, another embodiment of a luminescent screen is characterized in that $z = p = 0$
$0.01 \leq x \leq 0.50$
$0.05 \leq y \leq 0.75$
$x + y \leq 1$.

It was found that the most efficient Gd-emission is obtained with Gd-contents from 0.05 to 0.75 and Ce-contents from 0.01 to 0.50.

The most efficient green Tb-emission is found in the borates defined by the above-mentioned general formula and conditions, which do not contain Mn (p=0) and wherein all the available Y- and La-positions are occupied by Ce, Tb and, possibly, Gd ($x+y+z=1$) and wherein up to 20 mole % of the B be replaced by Al and/or Ga. From experiments it was found that such a slight replacement in the borates activated by Ce and Tb may result in higher luminous fluxes.

The highest luminous fluxes are obtained with the above-mentioned green-luminescing borates (p=0, $x+y+z=1$) when the Gd-concentration y is chosen in the range from 0.50 to 0.90, and 0.5 to 8 mole % of B is replaced by Al and/or Ga. It appeared, that the energy transfer from Ce to Tb proceeds very well via Gd-ions. The use of Gd in the above-mentioned range renders it possible to choose a lower Tb-content. Screens comprising these luminescing borates are therefore preferred, if green emission is desired.

Yet another advantageous embodiment of a luminescent screen according to the invention contains a borate having a composition defined by the above-mentioned general formula, and is characterized in that $z=0$, $x+y=1$, and wherein up to 20 mole % of the B may be replaced by Al and/or Ga. It was also found for the borates which were activated by Ce and Mn and which have the red Mn-emission that the most efficient materials are obtained when the Y and La have been wholly replaced by Ce and, possibly by Gd. It appears again that the transfer of excitation energy proceeds very well via Gd-ions. Therefore, preference is given to screens of this type, for which it holds that $0.50 \leq y \leq 0.99$, and wherein 0.5 to 8 mole % of B has been replaced by Al and/or Ga. The use of Gd renders it possible to choose a lower Mn-content, causing concentration quenching of the Mn-emission to become less likely. Also for these borates, activated by Ce and Mn, it holds that a small replacement of the B by Al and/or Ga may result in higher luminous fluxes.

A preferred embodiment of luminescent screen by means of which white light can be generated in combination with a low-pressure mercury vapor discharge comprises a borate, activated by Ce, Tb and Mn, and is characterized according to the invention in that the borate has a composition defined by the above-mentioned general formula and that $p \neq 0$ and $z \neq 0$, that $x+y+z=1$, and that up to 20 mole % of the B may be replaced by Al and/or Ga. It was found that also in these borates it is advantageous when Y and La are wholly replaced by Ce, Tb and, possibly, Gd. Preference is again given to the borates which contain Gd, wherein $0.50 \leq y \leq 0.90$, and wherein from 0.5 to 0.8 mole % of B is replaced by Al and/or Ga.

Some embodiments of the invention will now be further described and explained in greater detail with reference to the accompanying drawings.

Figure 2:
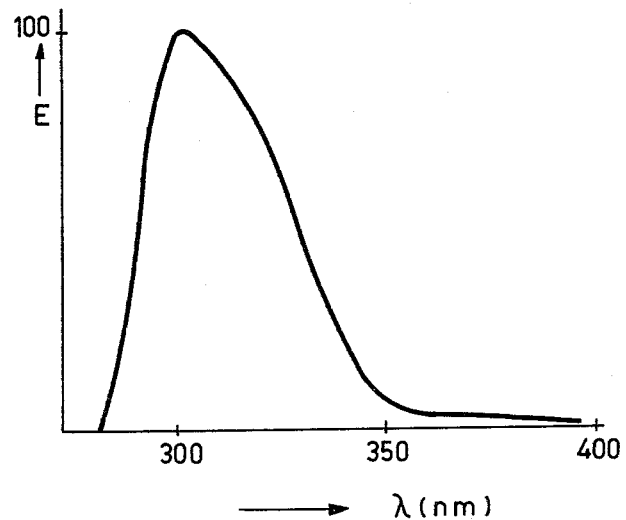
Figure 3:
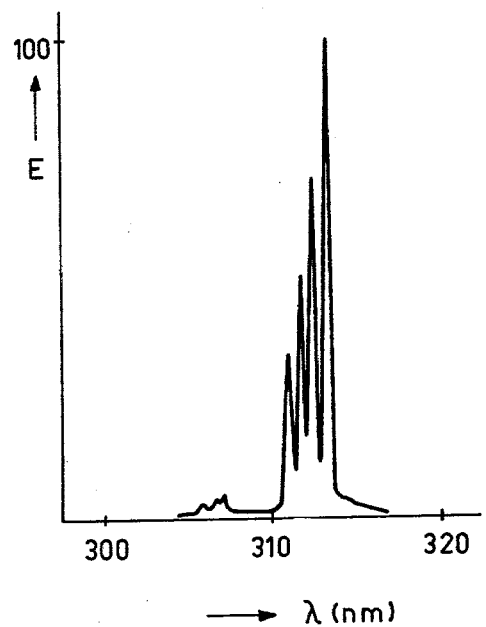
Figure 4:
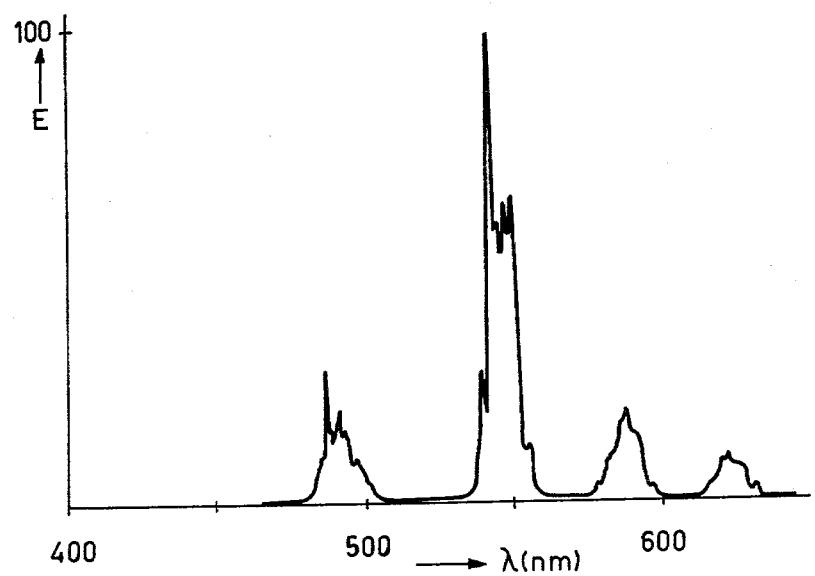
Figure 5:
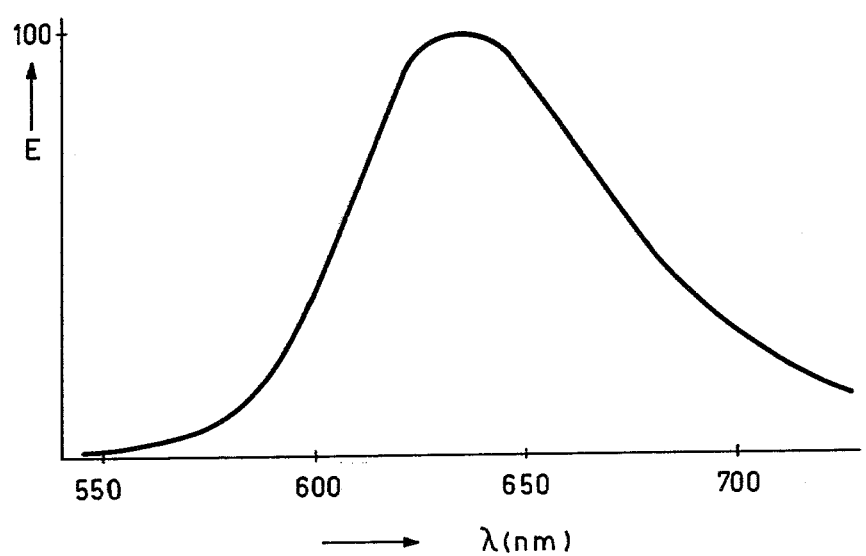

In the drawings:

FIG. 1 shows schematically and in cross-section a low-pressure mercury vapor discharge lamp according to the invention and FIG. 2 shows the emission spectrum of a borate according to the invention, activated by Ce alone, FIG. 3 shows the emission spectrum of a borate activated by Ce and Gd, FIG. 4 shows the emission spectrum of a borate activated by Ce and Tb, and FIG. 5 shows the emission spectrum of a borate activated by Ce and Mn.

In FIG. 1 reference numeral 1 denotes the glass wall of a low-pressure mercury vapor discharge lamp according to the invention. Electrodes 2 and 3 in which the discharge takes place during operation of the lamp are disposed, one each, at the ends of the lamp. The lamp contains a rare gas mixture, which serves as the igniting gas, and a small quantity of mercury. The wall 1 is constructed as a luminescent screen and is coated on its inside with a luminescent layer 4, which contains a luminescent metaborate according to the invention. The luminescent layer 4 may be applied to the wall 1 in a conventional manner, for example by means of a suspension containing the luminescent material.

EXAMPLE 1

A mixture was made of
1.76 g $La_2O_3$
0.21 g $CeO_2$
1.29 g $MgCO_3Mg(OH)_2.3H_2O$
4.01 g $H_3BO_3$ For each mole of metaborate to be formed this mixture comprises an excess of 0.1 mole Mg and 0.4 mole B. As generally known, the use of a slight excess of one or more of the constituent components may have an advantageous influence on the formation of the luminescent material. If so desired, the excess of B may be removed from the final product by washing with water. The above-indicated mixture was heated for 1 hour at 400° C. in a weakly reducing atmosphere. After cooling and pulverizing, the product thus obtained was subjected three times to a heat treatment, each time for 1 hour at 1045° C. in a weakly reducing atmosphere. After cooling and pulverizing, a luminescent metaborate having a composition defined by the formula $La_{0.90}Ce_{0.10}MgB_5O_{10}$ was obtained. X-ray diffraction analysis showed that this material (and also all the examples of materials according to the invention given hereafter) has a monoclinic crystal structure similar to the structure of, for example $LaCoB_5O_{10}$. On excitation by shortwave ultraviolet radiation (predominantly 254 nm-radiation), the borate appears to have a quantum efficiency of 72%. The emission spectrum of this material consists of a band (half-value width approximately 40 nm) with a maximum at approximately 302 nm. FIG. 2 shows this spectrum. In this Figure the wavelength $\lambda$ is plotted in nm on the horizontal axis and the emitted radiant energy E is plotted in arbitrary units on the vertical axis.

EXAMPLES 2 to 6

In a similar manner to that described in Example 1, a number of Ce-activated borates were prepared. The following Table I shows the formulae of these materials, together with the results of the measurements of quantum efficiency q (in %) and absorption A (in %) of the exciting radiation.

TABLE I

| Example | formula | q | A |
|---|---|---|---|
| 1 | $La_{0.90}Ce_{0.10}MgB_5O_{10}$ | 72 | 84 |
| 2 | $La_{0.95}Ce_{0.05}MgB_5O_{10}$ | 67 | 82 |
| 3 | $La_{0.85}Ce_{0.15}MgB_5O_{10}$ | 65 | 88 |
| 4 | $CeMgB_5O_{10}$ | 15 | 98 |
| 5 | $La_{0.90}Ce_{0.10}ZnB_5O_{10}$ | 52 | 86 |
| 6 | $Y_{0.90}Ce_{0.10}MgB_5O_{10}$ | 70 | 86 |

EXAMPLE 7

A mixture was made of
0.98 g $Gd_2O_3$
0.68 g $Y_2O_3$
0.10 g $CeO_2$
0.51 g MgO (excess of 0.05 mole per mole of borate to be formed)
4.45 g $H_3BO_3$ (excess of 1.0 mole per mole of borate to be formed).
This mixture was fired three times, each time for 1 hour, at 1035° C. in a weakly reducing atmosphere. The product was cooled and pulverized after each firing operation. The luminescent borate obtained had a composition defined by the formula $Gd_{0.45}Y_{0.50}Ce_{0.05}MgB_5O_{10}$. On excitation by 254 nm-radiation, the borate emits the characteristic Gd-radiation (some very narrow lines at approximately 312 nm). FIG. 3 shows the spectral energy distribution of the emission of this borate. The peak height of the maximum emission is 59% of the peak height of the known, Bi-activated gadolinium lanthanum borate having a composition defined by the formula $Gd_{0.5}La_{0.487}Bi_{0.013}B_3O_6$.

EXAMPLES 8 to 13

In a similar manner to that described in Example 7, a number of borates, activated by Ce and Gd, were prepared. The formulae of these materials and the results of measurements of peak height P (in a % figure with respect to the above-mentioned standard) and absorption A (in %) of the exciting radiation are summarized in Table II.

TABLE II

| Example | formula | P | A |
|---|---|---|---|
| 7 | $Gd_{0.45}Y_{0.50}Ce_{0.05}MgB_5O_{10}$ | 59 | 85 |
| 8 | $Gd_{0.25}Y_{0.70}Ce_{0.05}MgB_5O_{10}$ | 53 | 83 |
| 9 | $Gd_{0.75}Y_{0.20}Ce_{0.05}MgB_5O_{10}$ | 47 | 83 |
| 10 | $La_{0.4}Gd_{0.5}Ce_{0.1}ZnB_5O_{10}$ | 45 | 90 |

TABLE II-continued

| Example | formula | P | A |
|---|---|---|---|
| 11 | $La_{0.55}Gd_{0.35}Ce_{0.1}MgB_5O_{10}$ | 36 | 89 |
| 12 | $La_{0.35}Gd_{0.55}Ce_{0.1}MgB_5O_{10}$ | 57 | 90 |
| 13 | $La_{0.25}Gd_{0.65}Ce_{0.1}MgB_5O_{10}$ | 56 | 91 |

EXAMPLE 14

A mixture was made of
2.72 g $Gd_2O_3$
0.86 g $CeO_2$
0.93 g $Tb_4O_7$
1.06 g MgO (an excess of 0.05 mole per mole of borate to be formed)
8.11 g $H_3BO_3$ (an excess of 0.25 mole per mole of borate to be formed).
This mixture was heated for 1 hour at 1035° C. in a weakly reducing atmosphere. After cooling and pulverizing, the product obtained was once again subjected for 1 hour to the same temperature treatment. The luminescent borate obtained had a composition defined by the formula $Gd_{0.6}Ce_{0.2}Tb_{0.2}MgB_5O_{10}$, and, on excitation by short-wave ultraviolet radiation (254 nm) it has a quantum efficiency of the terbium emission of 76%. The emission spectrum consists of the characteristic Tb-radiation and is shown in FIG. 4.

EXAMPLES 15 to 26

A number of borates activated by Ce and Tb were prepared in the same manner as described for Example 14. The formulae of the materials obtained and the measured quantum efficiency q of the Tb-emission and the absorption A (in %) are shown in Table III.

TABLE III

| Example | formula | q | A |
|---|---|---|---|
| 14 | $Gd_{0.6}Ce_{0.2}Tb_{0.2}MgB_5O_{10}$ | 76 | 94 |
| 15 | $Gd_{0.7}Ce_{0.15}Tb_{0.15}MgB_5O_{10}$ | 75 | 94 |
| 16 | $Gd_{0.4}Y_{0.3}Ce_{0.15}Tb_{0.15}MgB_5O_{10}$ | 70 | 94 |
| 17 | $Gd_{0.4}La_{0.3}Ce_{0.15}Tb_{0.15}MgB_5O_{10}$ | 69 | 94 |
| 18 | $Ce_{0.95}Tb_{0.05}MgB_5O_{10}$ | 44 | 98 |
| 19 | $Ce_{0.6}Tb_{0.4}MgB_5O_{10}$ | 73 | 98 |
| 20 | $Ce_{0.3}Tb_{0.7}MgB_5O_{10}$ | 73 | 97 |
| 21 | $Gd_{0.94}Ce_{0.05}Tb_{0.01}MgB_5O_{10}$ | 60 | 85 |
| 22 | $Gd_{0.75}Ce_{0.05}Tb_{0.2}MgB_5O_{10}$ | 80 | 86 |
| 23 | $Gd_{0.65}Ce_{0.05}Tb_{0.3}MgB_5O_{10}$ | 80 | 85 |
| 24 | $Gd_{0.94}Ce_{0.05}Tb_{0.01}ZnB_5O_{10}$ | 59 | 89 |
| 25 | $Gd_{0.70}Ce_{0.05}Tb_{0.25}ZnB_5O_{10}$ | 76 | 90 |
| 26 | $Gd_{0.66}Ce_{0.14}Tb_{0.20}MgB_5O_{10}$ | 77 | 92 |

EXAMPLES 27 to 32

A number of borates according to the invention were prepared wherein a small quantity of the B had been replaced by Al or Ga in order to examine the influence of this substitution on the luminous flux of these materials. A mixture was made of
20.66 g $CeO_2$
65.25 g $Gd_2O_3$
22.43 g $Tb_4O_7$
58.16 g $MgCO_3Mg(OH)_2.3H_2O$
181.78 g $H_3BO_3$
3.06 g $Al_2O_3$.
This mixture, which contains the constituent components in stoichiometrical quantities, was heated twice, each time for 1 hour at 1035° C. in a weakly reducing atmosphere. The product obtained was washed for half an hour in water (at room temperature) and thereafter was filtered and dried (at approximately 120° C.). The borate obtained had a composition defined by the formula $Ce_{0.2}Gd_{0.6}Tb_{0.2}MgB_{4.9}Al_{0.1}O_{10}$ and shows the characteristic Tb-radiation.

In the same manner as described in Example 27, and additional number of Al- or Ga-containing borates were prepared (Examples 28 to 31). The material of Example 32 was produced for the purpose of comparison. This material does not contain Al or Ga and, in all other respects, is fully equal to the material of Example 27. The formulae and measurements of the quantum efficiency q of the terbium emission and absorption A (254 nm-excitation) for these materials are summarized in Table IV.

TABLE IV

| Example | formula | q | A |
|---|---|---|---|
| 27 | $Ce_{0.2}Gd_{0.6}Tb_{0.2}MgB_{4.9}Al_{0.1}O_{10}$ | 80 | 95.9 |
| 28 | $Ce_{0.2}Gd_{0.6}Tb_{0.2}MgB_{4.8}Al_{0.2}O_{10}$ | 80 | 95.5 |
| 29 | $Ce_{0.2}Gd_{0.6}Tb_{0.2}MgB_{4.6}Al_{0.4}O_{10}$ | 77 | 94.5 |
| 30 | $Ce_{0.2}Gd_{0.6}Tb_{0.2}MgB_{4.2}Al_{0.8}O_{10}$ | 63 | 91.3 |
| 31 | $Ce_{0.2}Gd_{0.6}Tb_{0.2}MgB_{4.9}Ga_{0.1}O_{10}$ | 79 | 96.5 |
| 32 | $Ce_{0.2}Gd_{0.6}Tb_{0.2}MgB_5O_{10}$ | 76 | 93.5 |

EXAMPLES 33 to 38

A luminescent borate, activated by Ce and Mn, defined by the formula $Gd_{0.95}Ce_{0.05}Zn_{0.9}Mn_{0.1}B_5O_{10}$ was obtained by heating a mixture of 4.30 g $Gd_2O_3$
0.22 g $CeO_2$
1.93 g ZnO (an excess of 0.05 mole per mole of borate)
0.32 g $MnCO_3$
8.11 g $H_3BO_3$ an excess of 0.25 mole per mole of borate), twice each time for 1 hour at 940° C. in a weakly reducing atmosphere. On 254 nm-excitation this borate (Example 33) shows the red Mn-emission band with a maximum at approximately 635 nm and a half-value width of approximately 75 nm). FIG. 5 shows the emission spectrum. Some further borates with Mn-emission were obtained in a similar manner to that described above. The formulae of these materials and the measured quantum efficiency q (in %) of the manganese emission and absorption A (in %) at 254 mn-excitation are shown in Table V.

TABLE V

| Example | formula | q | A |
|---|---|---|---|
| 33 | $Gd_{0.95}Ce_{0.05}Zn_{0.9}Mn_{0.1}B_5O_{10}$ | 80 | 86 |
| 34 | $La_{0.95}Ce_{0.05}Zn_{0.9}Mn_{0.1}B_4O_{10}$ | 60 | 90 |
| 35 | $Y_{0.95}Ce_{0.05}Zn_{0.9}Mn_{0.1}B_5O_{10}$ | 60 | 89 |
| 36 | $CeMg_{0.98}Mn_{0.02}B_5O_{10}$ | 48 | 98 |
| 37 | $CeMg_{0.89}Mn_{0.11}B_5O_{10}$ | 63 | 98 |
| 38 | $CeMg_{0.83}Mn_{0.17}B_5O_{10}$ | 61 | 98 |

EXAMPLES 39, 40 and 41

A borate, activated by Ce, Tb and Mn, defined by the formula $Gd_{0.6}Ce_{0.2}Tb_{0.2}Mg_{0.97}Mn_{0.03}B_5O_{10}$ was obtained starting from a mixture of 20.66 g $CeO_2$
65.25 g $Gd_2O_3$
22.43 g $Tb_4O_7$
23.48 g MgO
2.30 g $MnCO_3$
193.40 g $H_3BO_3$ (an excess of 0.21 mole per mole of borate).

This mixture was heated twice, each time for 1 hour, at 1035° C. in a weakly reducing atmosphere. After cooling, the product obtained was washed in water, filtered and dried. On excitation by 254 nm-radiation this borate shows both the characteristic Tb-radiation and also the red Mn-emission. Another two borates of this type were prepared in a similar manner. The formulae and measuring results of these materials are shown in Table VI. The values of the quantum efficiency q in this Table relate to the total efficiency of the Tb- and the Mn-emission.

TABLE VI

| Example | formula | q | A |
|---|---|---|---|
| 39 | $Gd_{0.6}Ce_{0.2}Tb_{0.2}Mg_{0.97}Mn_{0.03}B_5O_{10}$ | 70 | 91 |
| 40 | $Ce_{0.8}Tb_{0.2}Mg_{0.96}Mn_{0.04}B_5O_{10}$ | 64 | 98 |
| 41 | $Ce_{0.7}Tb_{0.3}Mg_{0.97}Mn_{0.03}B_5O_{10}$ | 74 | 98 |

A low-pressure mercury vapor discharge lamp of the type shown in FIG. 1, which is of the 40 W-type, was provided with a luminescent borate, activated by Ce and Tb, in accordance with the above Example 14. This lamp had an initial luminous flux of 109.3 lm/W, which was still substantially the same after the lamp had been in operation for 100 hours (109.1 lm/W).

Such a lamp, provided with a Ce, Tb and Mn-activated borate in accordance with the above Example 39 had an initial luminous flux of 55.6 lm/W. After the lamp had been in operation for 100 hours the luminous flux was still 54.7 lm/W. The colour point of the radiation emitted by this lamp was $x=0.438$ and $y=0.418$.

What is claimed is:

1. A luminescent screen, comprising a luminescent metaborate, having a monoclinic crystal structure provided on a support, characterized in that the metaborate has a composition defined by the formula

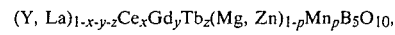

$(Y, La)_{1-x-y-z}Ce_xGd_yTb_z(Mg, Zn)_{1-p}Mn_pB_5O_{10}$, wherein,
if $y=z=p=0$, it holds that $0.01 \leq x \leq 1.0$,
if $z=p=0$, it holds that
   $0.01 \leq x \leq 1-y$
   $0.02 \leq y \leq 0.80$,
if $p=0$, it holds that
   $0.01 \leq x \leq 1-y-z$
   $0 \leq y \leq 0.98$
   $y+z \leq 0.99$
   $0.01 \leq z \leq 0.75$,
if $z=0$, it holds that
   $0.01 \leq x \leq 1-y$
   $0 \leq y \leq 0.99$
   $0.01 \leq p \leq 0.30$.
and if both $p \neq 0$ and $z \neq 0$, it holds that
   $0.01 \leq x \leq 1-y-z$
   $0 \leq y \leq 0.98$
   $0.01 \leq z \leq 0.75$
   $y+z \leq 0.99$
   $0.01 \leq p \leq 0.30$ and wherein when $p=0$ and $x+y+z=1$, up to 20 mole % of the B is replaceable by Al and/or Ga; when $z=0$ and $x+y=1$, up to 20 mole % of the B is replaceable by Al and/or Ga; and when both $p \neq 0$ and $z \neq 0$ and $x+y+z=1$, up to 20 mole % of the B is replaceable by Al and/or Ga.

2. A luminescent screen as claimed in claim 1, characterized in that $y=z=p=0$ and $0.01 \leq x \leq 0.50$.

3. A luminescent screen as claimed in claim 1, characterized in that
$z=p=0$
$0.01 \leq x \leq 0.50$
$0.05 \leq y \leq 0.75$
$x+y \leq 1$.

4. A luminescent screen as claimed in claim 1, characterized in that $p=0$ and $x+y+z=1$, and that up to 20 mole % of the B is replaceable by Al and/or Ga.

5. A luminescent screen as claimed in claim 4, characterized in that $0.50 \leq y \leq 0.90$, and that from 0.5 to 8 mole % of B is replaced by Al and/or Ga.

6. A luminescent screen as claimed in claim 1, characterized in that $z=0$ and $x+y=1$, and that up to 20 mole % of the B is replaceable by Al and/or Ga.

7. A luminescent screen as claimed in claim 6, characterized in that $0.50 \leq y \leq 0.99$, and that from 0.5 to 8 mole % of B is replaced by Al and/or Ga.

8. A luminescent screen as claimed in claim 1, characterized in that both $p \neq 0$ and $z \neq 0$ and $x+y+z=1$, and that up to 20 mole % of the B is replaceable by Al and/or Ga.

9. A luminescent screen as claimed in claim 8, characterized in that $0.50 \leq y \leq 0.90$, and that from 0.5 up to 8 mole % of B is replaced by Al and/or Ga.

10. A low-pressure mercury vapor discharge lamp comprising a luminescent screen as claimed in any one of claims 1 to 9.

* * * * *